(12) United States Patent
Jutras et al.

(10) Patent No.: US 10,749,340 B2
(45) Date of Patent: Aug. 18, 2020

(54) POWER SWITCH WITH POWER HARVESTING FOR LOCAL CONTROLLER

(71) Applicant: Bel Fuse (MACAO COMMERCIAL OFFSHORE) Limited, Andar H-K (MO)

(72) Inventors: Mark Jutras, Upton, MA (US); Scott Moore, Westford, MA (US); Mark Masera, North Grafton, MA (US)

(73) Assignee: Bel Fuse (MACAO COMMERCIAL OFFSHORE) Limited, Macao (MO)

( * ) Notice: Subject to any disclaimer, the term of this patent is extended or adjusted under 35 U.S.C. 154(b) by 535 days.

(21) Appl. No.: 15/660,637

(22) Filed: Jul. 26, 2017

(65) Prior Publication Data

US 2018/0034270 A1    Feb. 1, 2018

Related U.S. Application Data

(60) Provisional application No. 62/366,858, filed on Jul. 26, 2016, provisional application No. 62/381,306, filed on Aug. 30, 2016.

(51) Int. Cl.
| | | |
|---|---|---|
| *H02J 3/00* | (2006.01) | |
| *H02J 3/14* | (2006.01) | |
| *H05B 45/37* | (2020.01) | |
| *H02J 50/10* | (2016.01) | |

(52) U.S. Cl.
CPC .............. *H02J 3/007* (2020.01); *H02J 3/14* (2013.01); *H05B 45/37* (2020.01); *H02J 50/10* (2016.02); *H02J 2310/14* (2020.01); *Y02B 20/348* (2013.01); *Y02B 20/48* (2013.01); *Y04S 20/14* (2013.01)

(58) Field of Classification Search
CPC ............................... H02J 50/001; H02J 3/007
See application file for complete search history.

(56) References Cited

U.S. PATENT DOCUMENTS

| | | |
|---|---|---|
| 8,770,491 B2 | 7/2014 | Warren et al. |
| 8,963,369 B2 | 2/2015 | Sella et al. |
| 2009/0039852 A1 | 2/2009 | Fishelov et al. |
| | (Continued) | |

OTHER PUBLICATIONS

Wikipedia contributors. "Series and parallel circuits." Wikipedia, The Free Encyclopedia. Wikipedia, The Free Encyclopedia, Apr. 21, 2020. Web. Apr. 24, 2020 (Year: 2020).*

*Primary Examiner* — Daniel J Cavallari
(74) *Attorney, Agent, or Firm* — BainwoodHuang

(57) ABSTRACT

A power switch includes a bridge-connected switching circuit with (1) a pair of MOSFETs back-to-back in series between line and load connections, an interconnection point of the MOSFETs being a first common connection, and (2) a pair of diodes back-to-back between the line and load connections, an interconnection point of the diodes being a second common connection. A line/load controller has supply inputs connected to the first and second common connections for receiving operating power, and (1) places both MOSFETs in the ON state to deliver normal operating current to the load for normal operation, and (2) places both MOSFETs in the OFF state to deliver (by body diode conduction) a substantially reduced leakage current to the load when the load is not powered for normal operation, the leakage current providing the operating power to the line/load controller.

3 Claims, 14 Drawing Sheets

(56) References Cited

U.S. PATENT DOCUMENTS

| | | | |
|---|---|---|---|
| 2015/0048753 A1* | 2/2015 | Chen | H05B 45/3575 |
| | | | 315/250 |
| 2017/0271904 A1* | 9/2017 | Ziv | H05B 47/19 |
| 2017/0373614 A1* | 12/2017 | Lewis | H02K 7/145 |
| 2018/0007766 A1* | 1/2018 | Linnartz | H05B 45/395 |

* cited by examiner

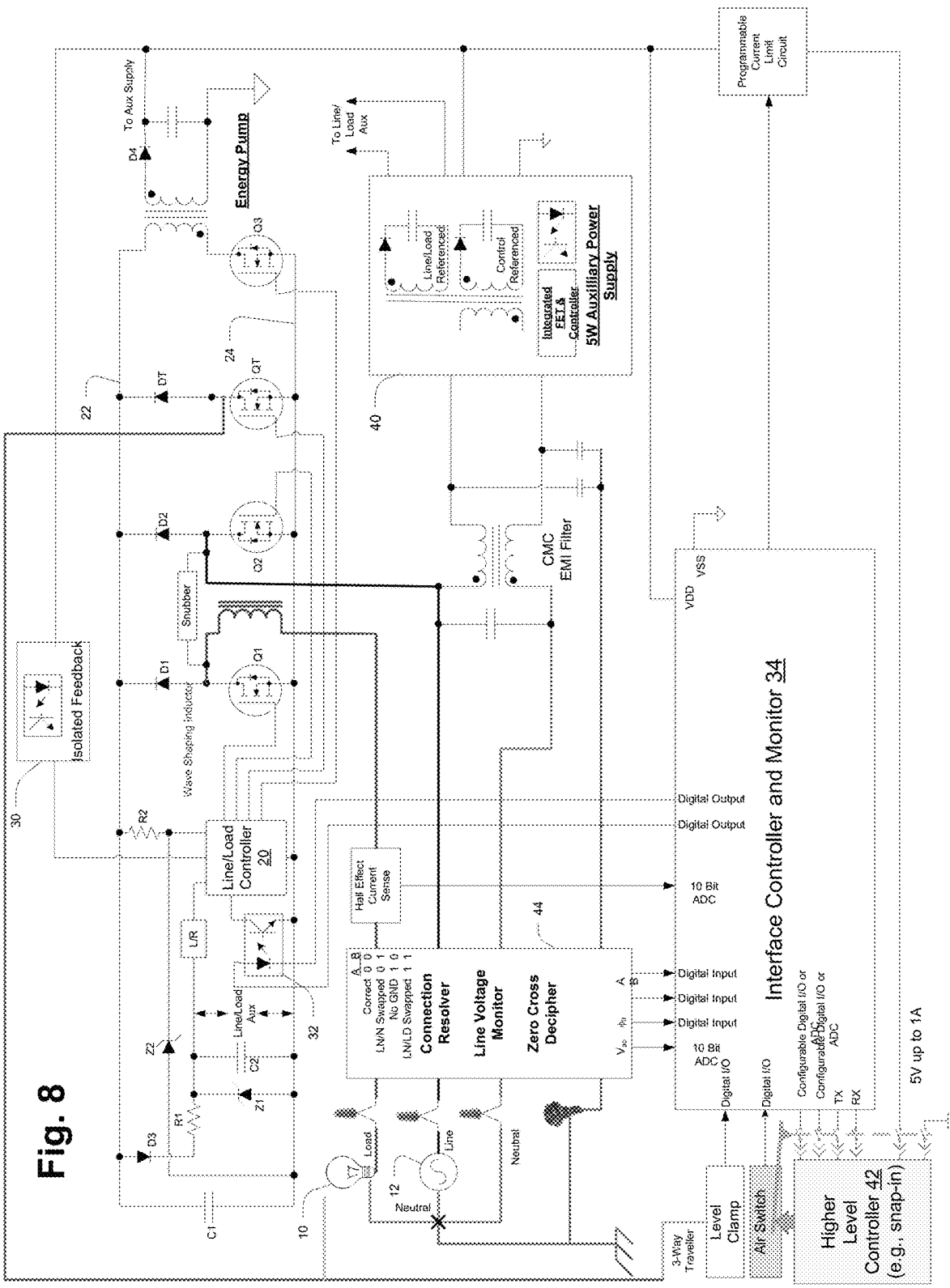

US 10,749,340 B2

POWER SWITCH WITH POWER HARVESTING FOR LOCAL CONTROLLER

BACKGROUND

The present invention relates to the field of power circuitry, and in particular to power switches (e.g., light switches) providing for selectable delivery of power to a load (e.g., electric lamp).

SUMMARY

One of the challenges in creating a smart light switch is generating an auxiliary power source to power local control logic and communication of the light switch. To power a small local microcontroller to implement basic on/off control and/or dimming by means of a simple mechanical or touch interface, the amount of power required is quite small (e.g., 100 mW or less) and creating a power source is less challenging. Given the availability of more sophisticated interface devices, various transducers to implement smart functions and the widespread use of wireless communication, the power requirements for a more advanced smart switch may be much higher (e.g., 1 W or more). This means that a power source needs to be created capable of providing energy to these advanced circuits either directly or by helping to trickle charge an energy storage device such as a battery or super capacitor that can periodically provide the required power.

As known, a power switch is typically housed in an enclosure, referred to herein as a "switch box". The switch box serves not only as a packaging element, but also as a wiring point. In building wiring that has been installed after 2011, it is likely that each switch box contains both the line and neutral feeds from the circuit panel in addition to the load wire that needs to be controlled. In this case it may be fairly straightforward to realize an auxiliary power source with inputs connected between line and neutral. In older switch box wiring, it is common that only the line and load connections are present, and the lack of a return (neutral) means that the straightforward approach cannot be used. Furthermore, this scenario can be complicated by the variability of lamp technologies, i.e., incandescent, LED, CFL, etc. An incandescent lamp presents essentially a resistive characteristic which can be exploited to generate a small leakage current, while other technologies generally implement front-end conditioning/conversion circuitry that may not provide the same ability.

Disclosed herein is a power switch that includes a line connection to a line side of an AC supply, and a load connection to a load, the load having a return connection (i.e., neutral) to a return side of the AC supply. The power switch further includes a bridge-connected switching circuit including (1) a pair of MOSFETs connected back-to-back in series between the line connection and the load connection, an interconnection point of the MOSFETs being a first common connection, and (2) a pair of diodes connected back-to-back between the line connection and the load connection, an interconnection point of the diodes being a second common connection, each MOSFET having an ON state in which the MOSFET provides bidirectional channel conduction and an OFF state in which the MOSFET provides unidirectional body diode conduction. The power switch further includes a line/load controller having a pair of supply inputs connected respectively to the first and second common connections for receiving operating power. The line/load controller is arranged and operative to (1) place both MOSFETs in the ON state to deliver normal operating current to the load when the load is to be powered for normal operation, and (2) place both MOSFETs in the OFF state to deliver a substantially reduced leakage current to the load when the load is not to be powered for normal operation, the leakage current providing the operating power delivered to the line/load controller via its supply inputs.

The disclosed power switch provides for efficient harvesting of a small amount of power through the load itself, by its use of the bridge-connected switching circuit including the diodes and series-connected MOSFETs. It thus enables flexible deployment including in installations in which the neutral conductor of a power circuit is not wired into the switch enclosure.

Other aspects of the disclosure are directed to using only a "skirt" part of the conduction cycle (in a small neighborhood of zero) for harvesting power; using wireless charging of a separate switch module, which may be a higher level controller in a smart power system, for example; use of a wave-shaping inductor; use of an optically isolated, low-power OFF circuit for a startup circuit; and a managed AC source providing leakage current for a power-harvesting power switch.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIGS. 8-13 are schematic diagrams of power converters;

DETAILED DESCRIPTION

Figure 1:
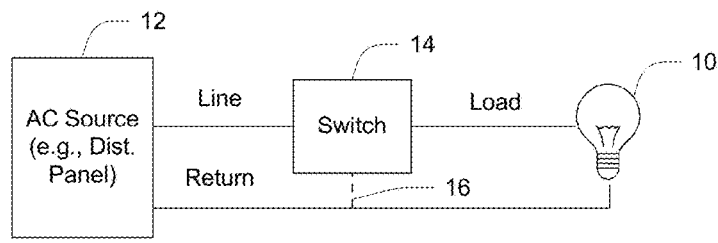
FIG. 1 is a block diagram of a power converter.

FIG. 1 shows the general environment of the presently disclosed circuits and techniques. A load 10 such as a lamp is powered from an AC source 12 (e.g., an AC distribution panel) via a user-controlled switch 14, such as a wall-mounted switch in a bedroom, office, etc. The switch 14 selectively makes/breaks a connection between a Line conductor (from source 12) and a Load conductor (to load 10). Current flows from the source 12 via the Line conductor, switch 14, and Load conductor to the load 12, then returns via the Return conductor, also referred to herein as "Neutral". As indicated at 16, the Return conductor may or may not pass through the switch 14, which as explained above can complicate the harvesting of power for local circuitry within the switch 14. Approaches for addressing this complication are described herein.

As outlined above, described herein is a technique for harvesting energy from leakage current that can be passed through the load and using this harvested energy to power local circuits and provide an energy source to either directly power a higher level controller or charge an energy storage component.

Figure 2:
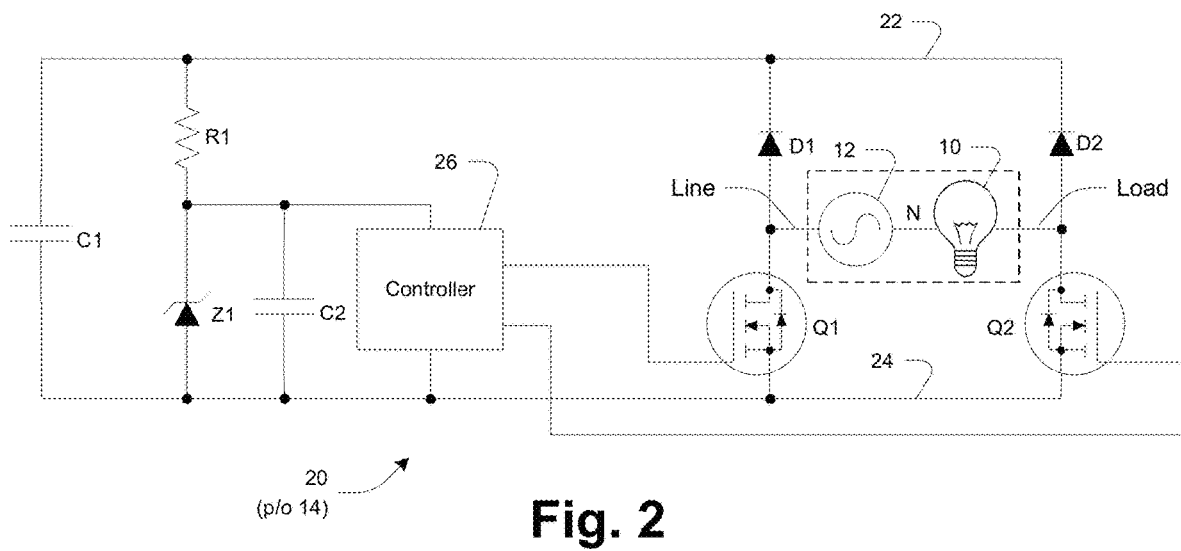
FIG. 2-4 are schematic diagrams of power converters.

FIG. 2 shows a first example circuit 20, which would be part of the switch 14 of FIG. 1. This circuit requires no connection to the system Return or Neutral, which is shown as N and connected between the source 12 and load 10. Diodes D1 and D2 and MOSFETs Q1 and Q2 are arranged in a bridge configuration across four circuit nodes including the Line node, Load node, and first and second local supply nodes 22, 24. In the illustrated embodiment, the local supply nodes are a high-side node 22 and a low-side node 24, which serves as a local neutral or return.

When Q1 and Q2 are ON, the primary switch action of connecting Line to Load is achieved for normal operation, i.e., illumination of the lamp. Current flows from the source 12 through the two MOSFETs Q1, Q2 and to the load 10, returning to the source 12 by the external neutral connection. When Q1 and Q2 are off, their associated body diodes along with D1 and D2 create a full wave bridge rectifier and charge the capacitor C1 by means of leakage current that flows through the load. The action of turning on/off Q1/Q2 is managed by a controller 26, which may employ certain timing as described below for harvesting energy and providing normal load current. The controller 26 receives its operating power from the bridge circuit via the supply nodes 22, 24. An additional capacitor, C2, is used to provide holdup for the line/load controller 26 and is peak charged through a resistor R1. A Zener diode Z1 can provide voltage clamping if necessary.

Figure 3:
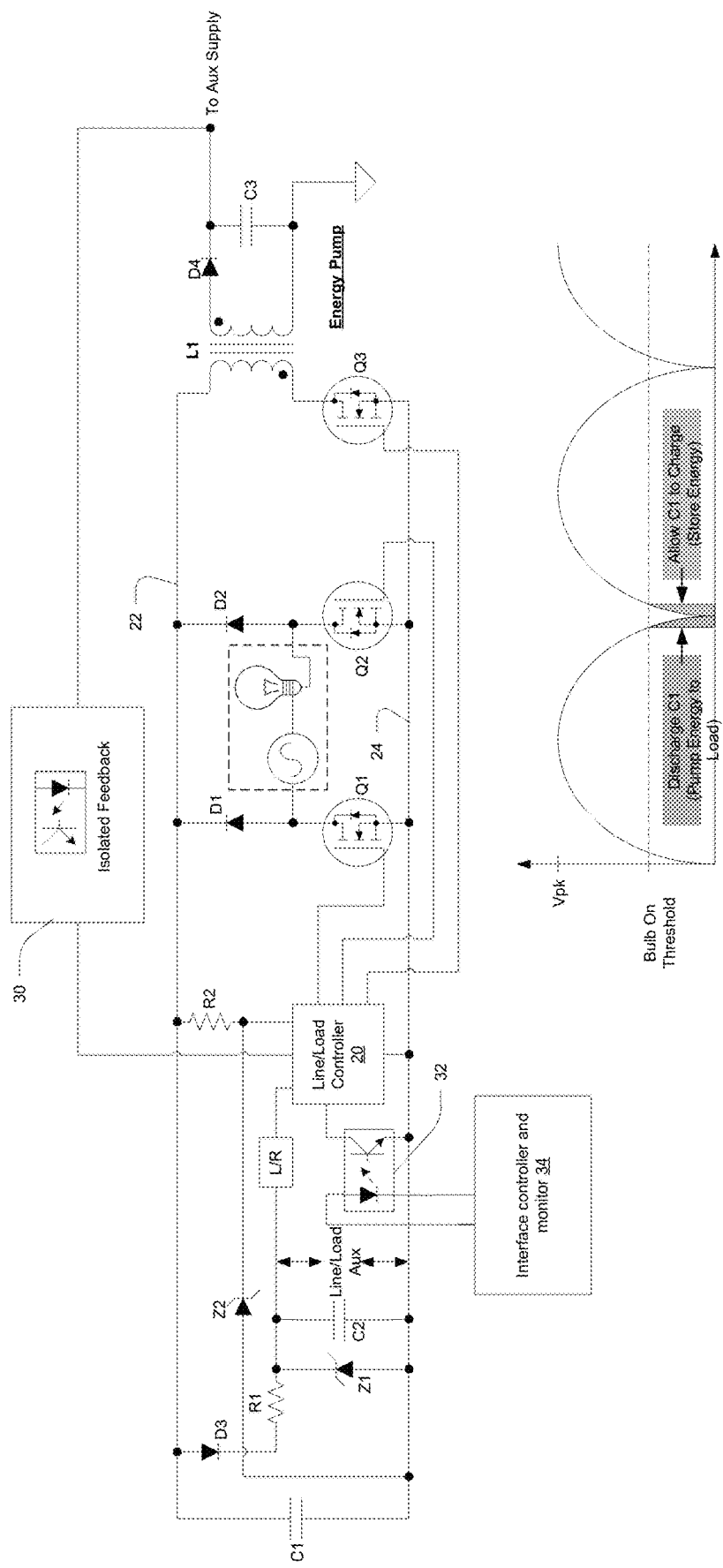

FIG. 3 shows an expanded version of the circuit of FIG. 2, including certain additional circuitry for additional functionality as now described. In one respect it includes support for a separate auxiliary (Aux) power supply, not shown. Once C1 is charge the stored energy can be pumped to s separate auxiliary power supply rail by means of inductor L1 and transistor Q3. When Q3 is turned on some of the energy in C1 is transferred to L1, and when Q3 is subsequently turned off this energy is then transferred to C3 through D4 by the flyback action defined by the polarity of the L1 windings. The action of modulating Q3 on/off for several switching cycles makes up the energy pumping function. The line/load controller 20 receives isolated feedback via an opto-coupler 30.

The circuit includes a linear regulator L/R that may have input voltage limits, in which case the Zener diode Z1 provides clamping as a means of not exceeding those voltage limits.

An opto-coupler 32 connects to the Line/Load controller 20 and is used to send control information from an interface controller and monitor 34. When Q1 and Q2 are turned on to implement the intended switching function (turning on the light in this case), the low-side node 24 becomes connected to the AC line. This node needs to be considered floating with respect to the AC line, and as a result the isolation elements shown in this diagram are necessary.

FIG. 3 also illustrates the timing of the above-described operations within the half-cycles of the AC waveform. When the line voltage is above a threshold shown as "bulb on threshold", the transistors Q1 and Q2 are ON and normal operating current is being provided to the load (lamp). Late in the half-cycle when the line voltage falls below the threshold, energy is pumped to the auxiliary supply from C1 as described above. Early in the half-cycle when the line voltage has not yet reached the threshold, C1 is charged by the bridge rectifier operation as described above.

Figure 4:
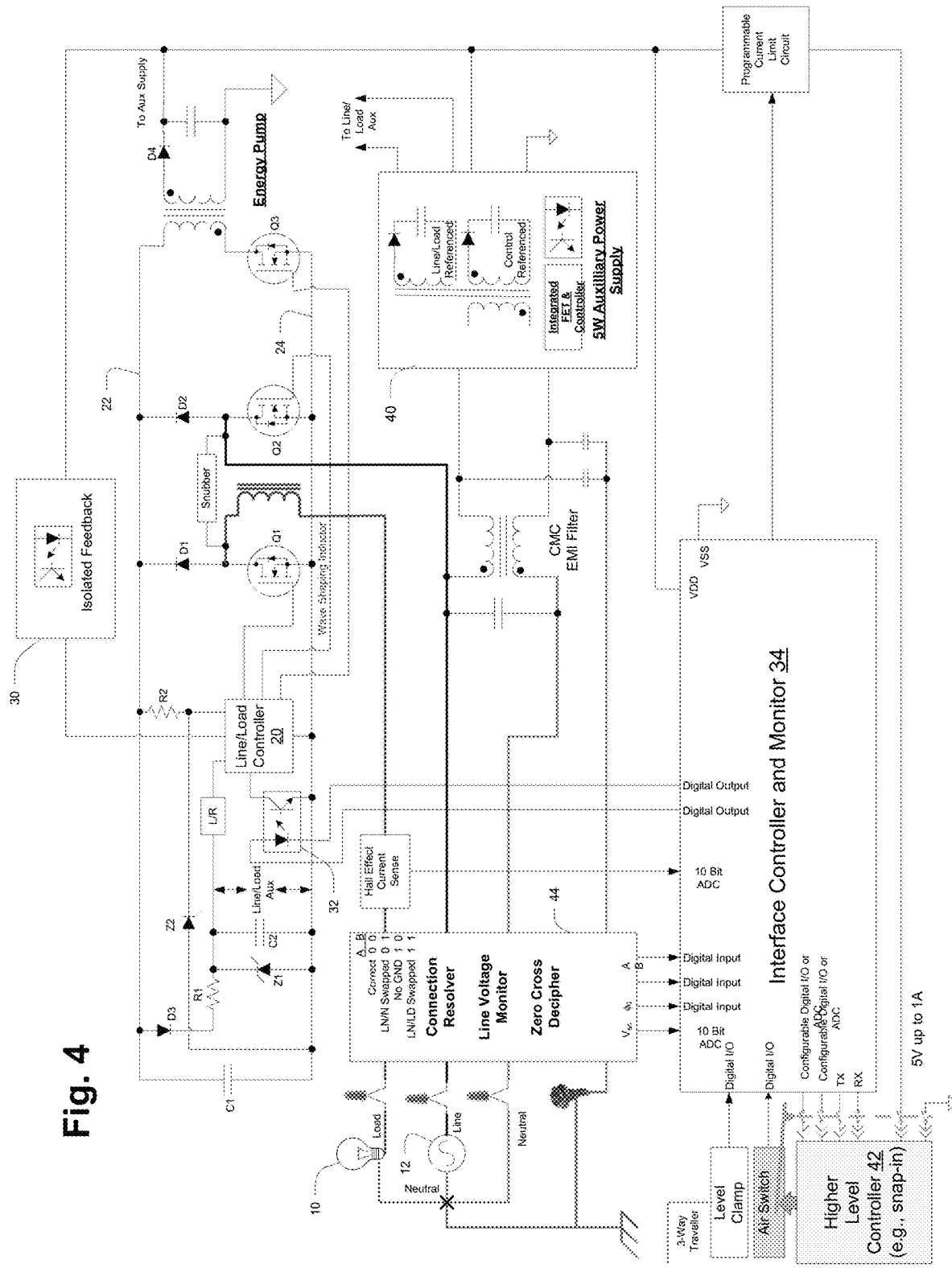

FIG. 4 shows elements of a more complete system, including the elements of FIGS. 2 and 3 as well as others as now described. FIG. 4 shows the auxiliary power supply 40 powered from line and neutral that is used to create a reliable and predictable power source when neutral is present (i.e., connected to the switch box housing the illustrated circuitry, as mentioned above). If neutral is absent, all of the power for the local circuits is derived from the energy harvesting and energy pumping circuits as explained above. In this case there may also be a need to provide a power source for a separate higher level controller 42, which may be a modular pluggable ("snap-in") device as indicated. The higher level controller 42 communicates with the interface controller and monitor 34 via a serial interface. In the case that the only energy that is available is that that is harvested from the load connection. As such the amount of power that can be delivered to the higher level controller may be limited. In that case the higher level controller 42 may contain an energy storage device that is charged using the residual energy form the harvesting circuitry. The residual energy is what is available in excess of that used by the local circuits. In this case that status can be communicated to the higher level controller 42 through the serial interface protocol. A programmable current limit circuit may be added to prevent the attached higher level controller 42 from taking more power than can be afforded, with this being managed by the local interface controller and monitor 34.

FIG. 4 also shows connections to the separate load 10 and source 12 via circuitry 44 that includes a connection resolver, line voltage monitor and zero cross detector. Information from these circuits is provided to the interface controller and monitor 34 via respective digital output signals as shown.

The ability to harvest energy by means of current leakage through the load is not always a predictable and reliable means of bleeding energy into a storage element such as C1. Incandescent light bulbs look resistive and thus lend themselves to such an application. Many LED light bulbs have switching power supply front ends, although many of these circuits contain elements that force a certain amount of leakage current through the load wire for the purpose of providing holding current for triacs that are used in traditional triac dimmer circuits. Such LED lamps will provide a current source that can be used to charge C1 through the load as described above.

Figure 5:
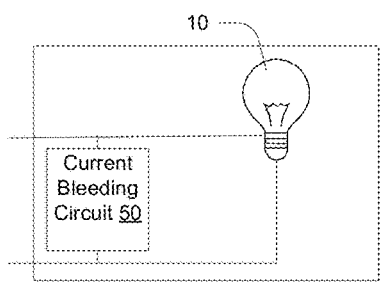
FIG. 5 is a block diagram of a load circuit with current bleeding.
Figure 6:
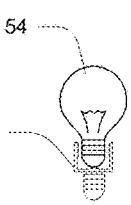
FIG. 6 is a schematic depiction of a lamp with an adapter base.
Figure 7:
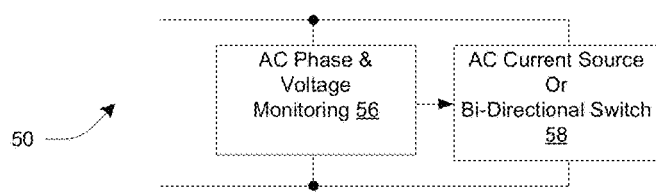
FIG. 7 is a block diagram of a current bleeding circuit.

FIGS. 5-7 depict an accessory device (or "current bleeding circuit") 50 that may be used when the lighting device that is present as the load 10 does not afford a reasonable source of leakage current to charge C1. In this case the accessory device 50 may be retrofitted with the bulb or may reside in the light fixture or wiring box. In theory only one of these circuits would be required per switch branch. FIG. 6 shows a retrofit example in which the circuit 50 is realized within an adapter 52 that receives a bulb 54 and includes a compatible base for mating with a light fixture. The accessory device 50 includes circuitry 56 that monitors line voltage and phase and controls a current sourcing element or switch 58 in parallel with the lamp in such a way to provide a leakage current during certain portions of the voltage waveform applied across the lamp. This arrangement guarantees a source of current that can be used to harvest energy in a switch box that is void of a neutral wire, such as described above with reference to FIGS. 2-4.

FIG. 8 shows a circuit similar to that of FIG. 4 and including an additional transistor QT for switching current to a separate "traveler" conductor such as used in typical 3-way wiring scenarios.

Figure 9:
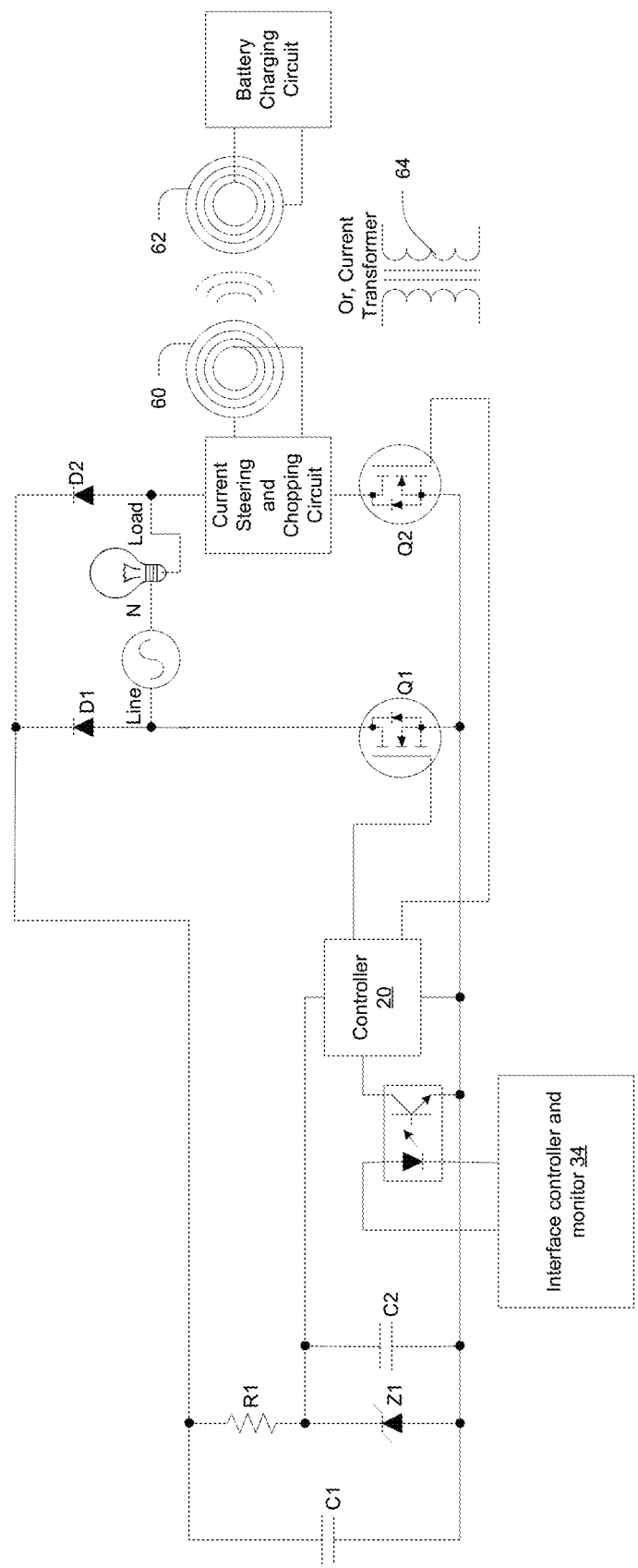

FIG. 9 shows another concept that is a possible solution for harvesting energy through the load connection. In this implementation, a wireless charging function is established using a transmitter coil 60 and closely coupled receiver coil 62. With proper magnetic core materials this may be modulated with the 60 Hz line frequency current delivered through the load. If high frequency operation is required, the current could be chopped at a higher frequency by means of switching Q1/Q2 on and off at a high frequency. In this case additional circuit elements can be added to handle proper steering of any inductor currents flowing in the wiring. As shown, wireless charging may also be accomplished using a transformer 64 instead of separate coils 60, 62.

FIGS. 10-13 show a detailed example of a commercial product incorporating the disclosed switch technique.

Figure 10:
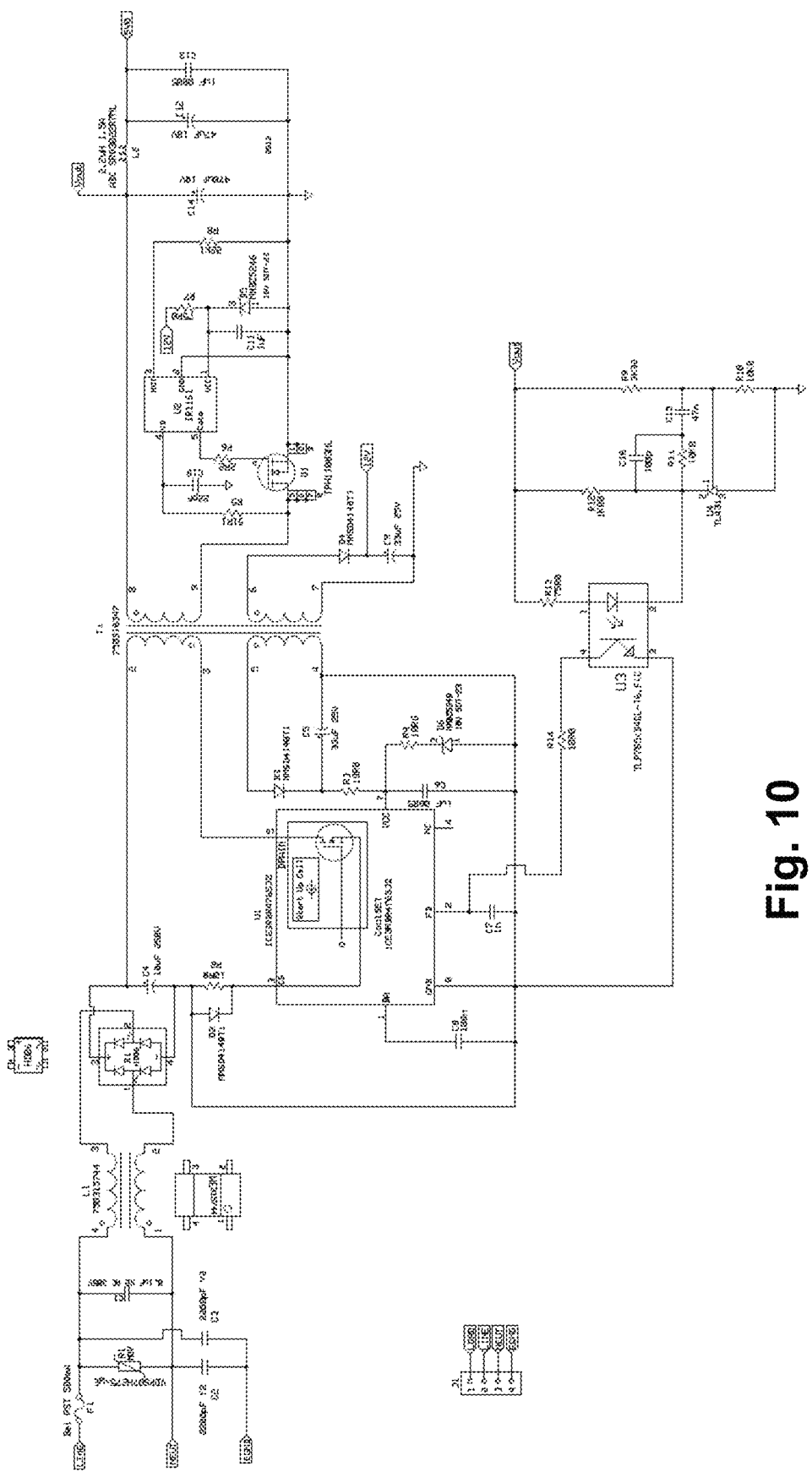

FIG. 10 shows an example line/neutral isolated auxiliary supply, a realization of the auxiliary supply 40 of FIG. 8 for example.

Figure 11:
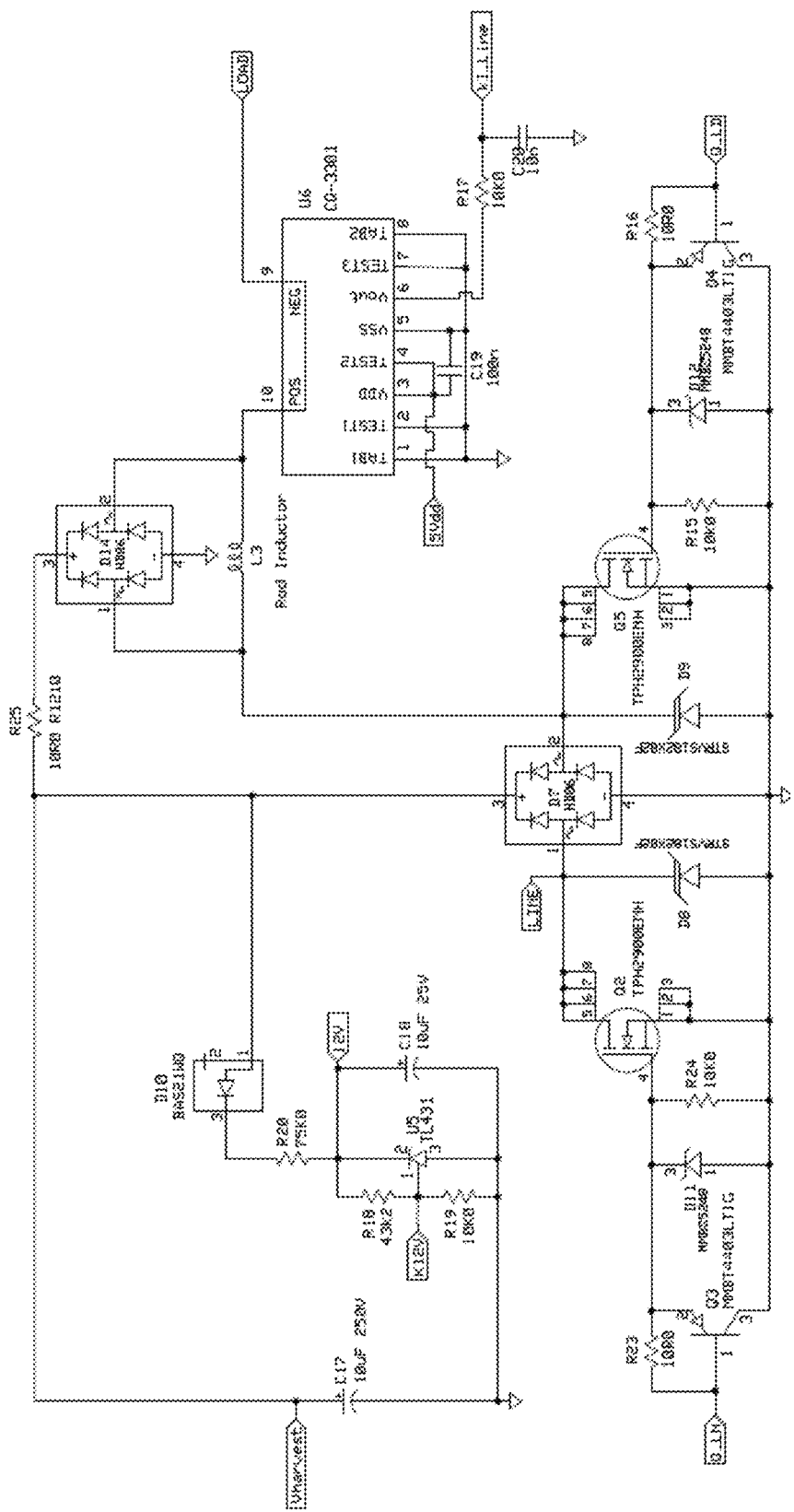

FIG. 11 shows a more detailed implementation of switch interface an energy harvesting circuitry such as described above with reference to FIGS. 2-4 for example. This circuit also includes diodes D7 and D14 as well as resistor R25 and inductor L3, which is the device labeled as "wave shaping inductor" in FIG. 4. Diode D14 is used to rectify any voltage transients across L3 and move the resultant energy into the energy harvesting capacitor shown as C17. R25 provides a means to dissipate a small portion of that energy to help dampen any ringing for the purpose of reducing electrical noise (EMI). When the switching devices Q2 and Q5 are on, current flows from the line connection through the load connection. If Q2 and Q5 are turned off when current is still flowing in the inductor L3, D14 provides a means to capture that residual energy. Since current through an inductor cannot change instantaneously, if the path which current flows through L3 is abruptly interrupted the voltage across L3 increases until it reaches the voltage across C17 and the rectifier D14 provides a current path allowing the energy stored in L3 to transfer to C17.

Figure 12:
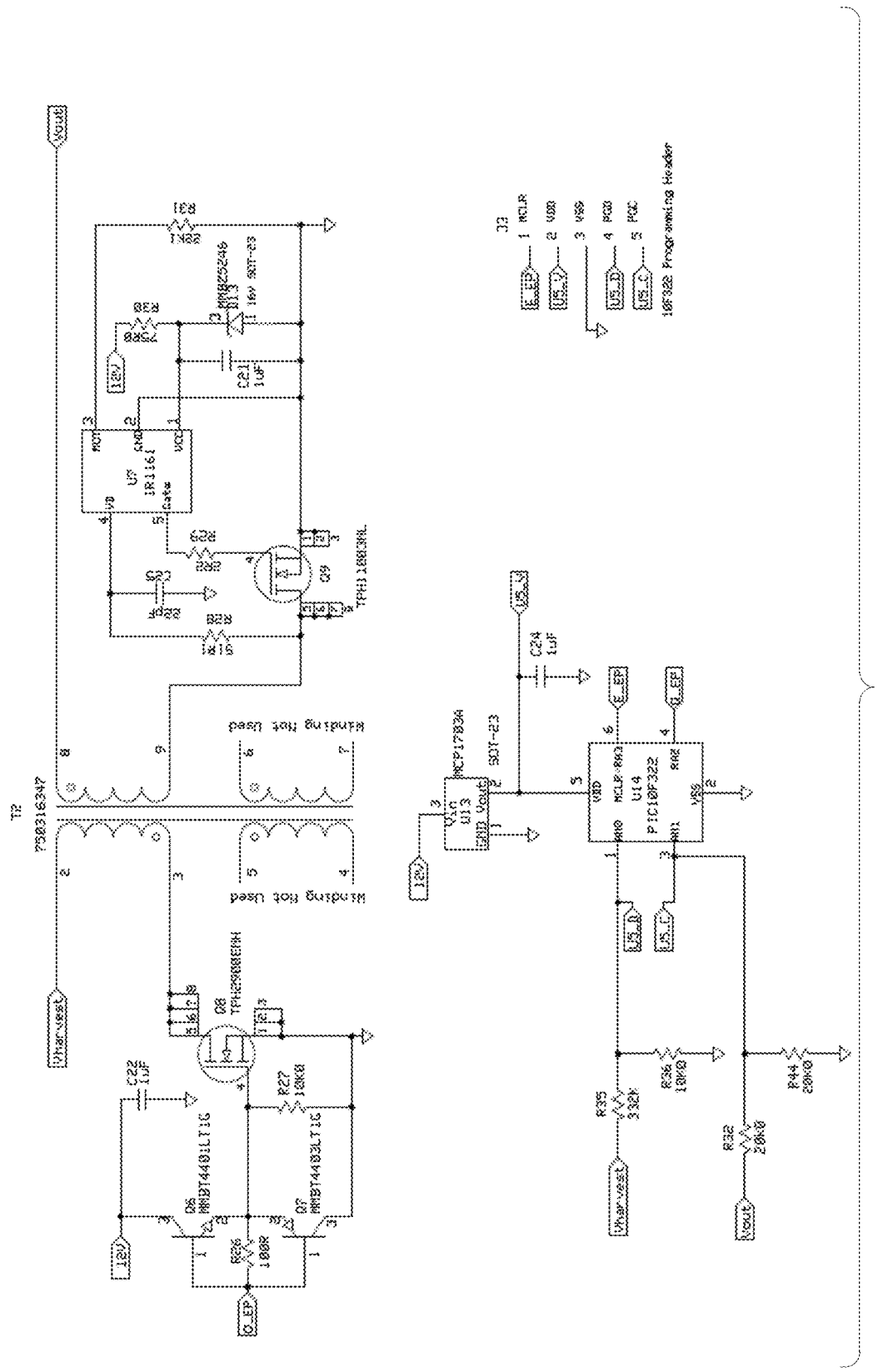

FIG. 12 shows an example of a harvested energy pumping circuit, a more detailed realization of the above-described energy pumping technique.

Figure 13:
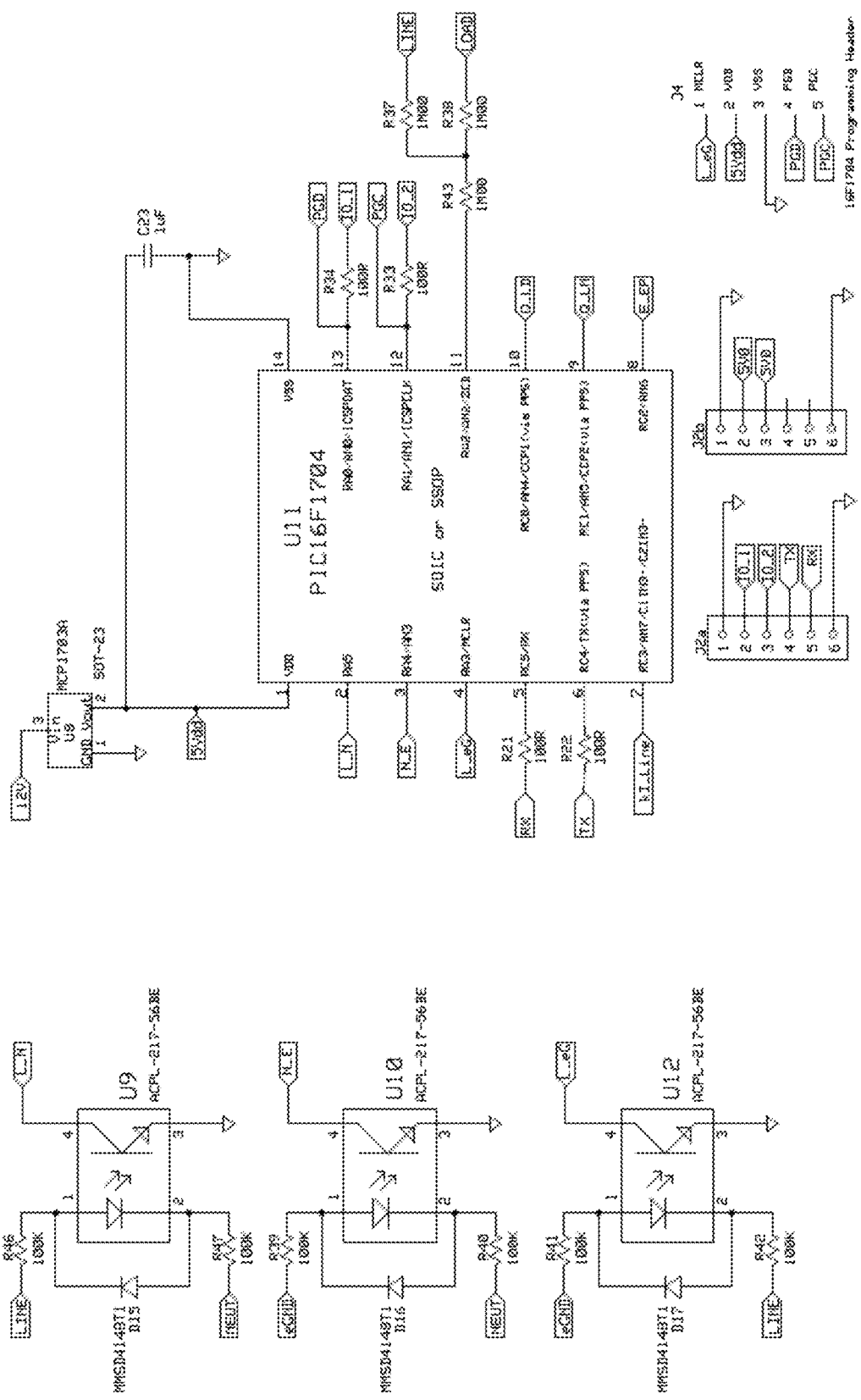

FIG. 13 shows an example of microcontroller and related circuitry including a microcontroller U11 that realizes the Line/Load controller 20 of FIGS. 2-4 for example.

Figure 14:
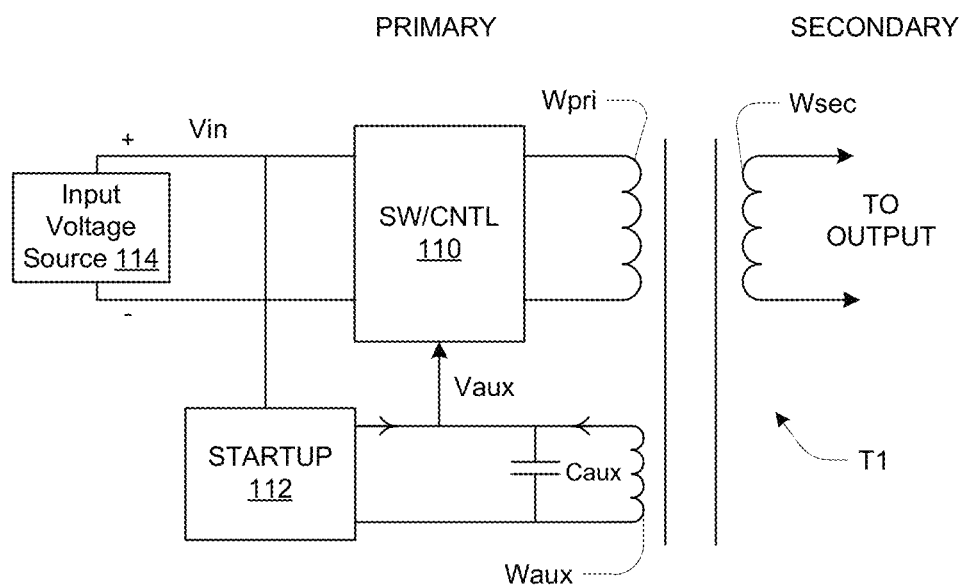
FIG. 14 is a schematic diagram of a portion of a power converter with a startup circuit.

FIG. 14 shows a portion of a switching power supply using a startup circuit. It includes switching and control (SW/CNTL) circuitry 110, a power transformer T1, a startup circuit 112, and optionally an input voltage source 114. The transformer T1 has main primary and secondary windings Wpri and Wsec, as well as a third or "auxiliary" winding Waux connected to a capacitor Caux. The switching and control circuitry 110 receives a DC voltage Vin as well as a voltage Vaux developed on the capacitor Caux. The voltage Vin is provided by the input voltage source 114 when present, and otherwise it may be an input from a separate voltage source.

Pertinent operation of the power supply is divided into two periods, an initial startup period in which Vin is rising from zero to a normal operating value, and a subsequent steady-state operating period in which Vin is at its normal operating value and the power supply is providing a steady DC output voltage to separate powered circuitry (not shown). The switching and control circuitry 110 includes circuitry (not shown) that receives its operating power from the Vaux input; examples are described below. During steady-state operation, the combination of the winding Waux and capacitor Caux function as a simple power source for this circuitry. During at least an initial part of the startup period, no or little current is provided to the main primary winding Wpri and therefore no or little power is available via the winding Waux. The startup circuit 112 operates during this period along with Caux as the power source, until operation has proceeded to the point that the normal steady-state mechanism employing winding Waux is available and becomes operative.

Figure 15:
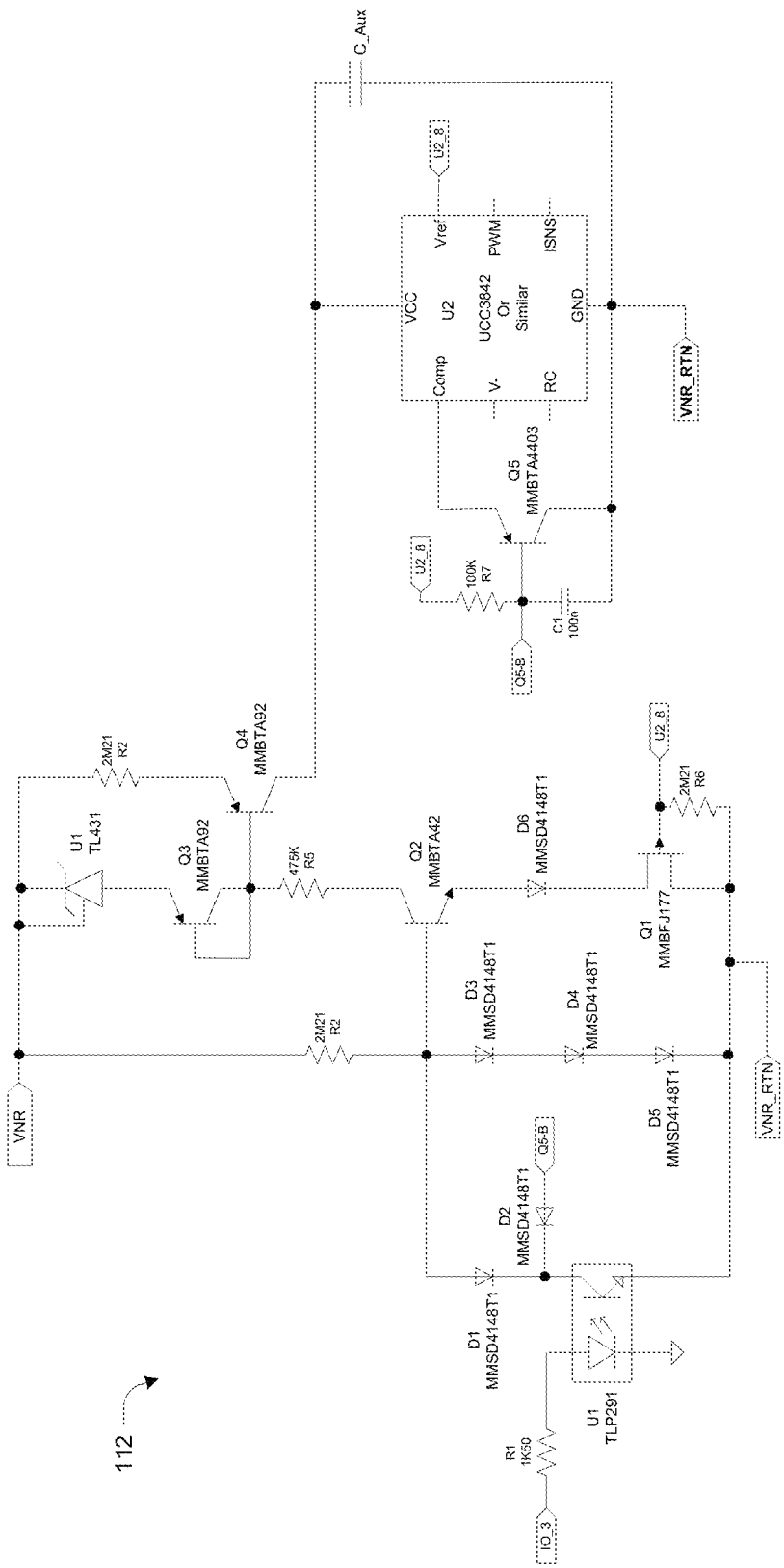
FIG. 15 is a schematic diagram of a startup circuit.

FIG. 15 shows the startup circuit 112 according to one embodiment. Its main purpose is to generate an unregulated supply voltage Vaux usable by the switching and control circuitry 110 (FIG. 14) during an initial startup period of operation before all normal operating voltages have been established. Vaux is generated by supplying a charging current Ic(Q4) to the capacitor Caux, which occurs in response to another current Ic(Q2) that flows during an initial part of the startup period. Detailed operation is described below. One important feature is provided by a normally on transistor Q1, which may be implemented as a depletion-mode junction FET (J-FET) for example. Q1 conducts during startup to allow generation of Ic(Q2), and at the end of startup it is rendered non-conducting by application of an inhibitory control signal in the form of a positive gate voltage Vg(Q1) from a separate Vg generator (not shown). This effectively disables the startup circuit 112, reducing its power dissipation and improving overall efficiency of the power supply accordingly.

Overall, the transistors Q1-Q4 and related circuitry form a startup current source that pulls power from the input source to generate the charging current Ic(Q4) for the storage capacitor Caux. In the illustrated configuration the startup current source includes two sub-level current sources—an emitter-switched current source formed by Q2, Q1 and related circuitry that generates Ic(Q2), and a second current source (referred to as an output current source) that responds to Ic(Q2) to generate the charging current Ic(Q4). In this configuration the current Ic(Q2) may be seen as an enabling current that enables Q4 to conduct the charging current Ic(Q4).

In the illustrated arrangement, Q1 is a P-Channel depletion mode J-FET. A depletion mode FET is on (conducting) when zero volts is applied to its gate, and is turned off when a voltage in excess of a cutoff voltage is applied to its gate. At the very beginning of startup operation when Vin is equal to zero, Vg(Q1) has zero volts applied and Q1 behaves as if it were a resistor connected from the emitter of Q2 to the return potential. Once the voltage on the base of Q2 becomes high enough to establish current flow through Q2's base-emitter junction, it begins conducting. This will establish current flow through voltage-creating (V-C) elements U1, Q3 connected between Vin and the base of Q4. Once the voltage created by the V-C elements is sufficient to establish base-emitter current in Q4, then collector current flows in Q4. This collector current is proportional to the voltage across R4, which is equal to the voltage across the V-C elements minus the base-emitter voltage drop ($V_{BE}$) for the conducting Q4. The Q4 collector current Ic(Q4) flows in a path that allows it to charge Caux.

When Caux is charged to a sufficiently high voltage that allows startup of the power converter, current flows in the primary winding Wpri (FIG. 14) and by magnetic coupling in the auxiliary winding Waux as well. This current maintains the voltage Vaux across Caux as part of steady state operation of the power supply. Additionally, at this point the Vg generator generates an inhibitory control signal in the form of a non-zero gate voltage Vg(Q1), which is supplied to the gate of Q1 in order to turn Q1 off. When Q1 is off, no current flows through Q2, and thus Q4 is off and the startup current used to charge Caux is terminated. With the startup current disabled, no power loss from the startup circuit exists other than small losses from the input voltage monitoring circuitry R2 and D3-D5.

The cascade configuration of Q2, D6 and Q1 are used to switch on/off the current source formed by Q4, R2, Q3 and U1. This current source starts the PWM controller U2. Once the PWM controller is started, the signal U2_8 turns off Q1, turning off this start up current source. The opto-coupler U1 provides for disabling the power supply from an external signal in a way that dissipates very little bias power. When the LED in U1 is turned on by applying a voltage to the signal IO_3, the transistor in the opto-coupler U1 is also turned on. This is the mechanism for entering the low power shutdown condition. In this condition, through D1, the collector of the opto-coupler's transistor pulls the base of Q2 to a voltage low enough to turn Q2 off, disabling the startup current source and thus preventing a start of the PWM controller. In the case that the PWM controller is running at the time of being disabled, its operation is terminated by additional circuitry. In particular, a pull down path through D2 pulls the collector of Q5 to a low enough voltage to disable the PWM's soft start circuit and force its error voltage to a low enough value to stop PWM operation.

Figure 16:
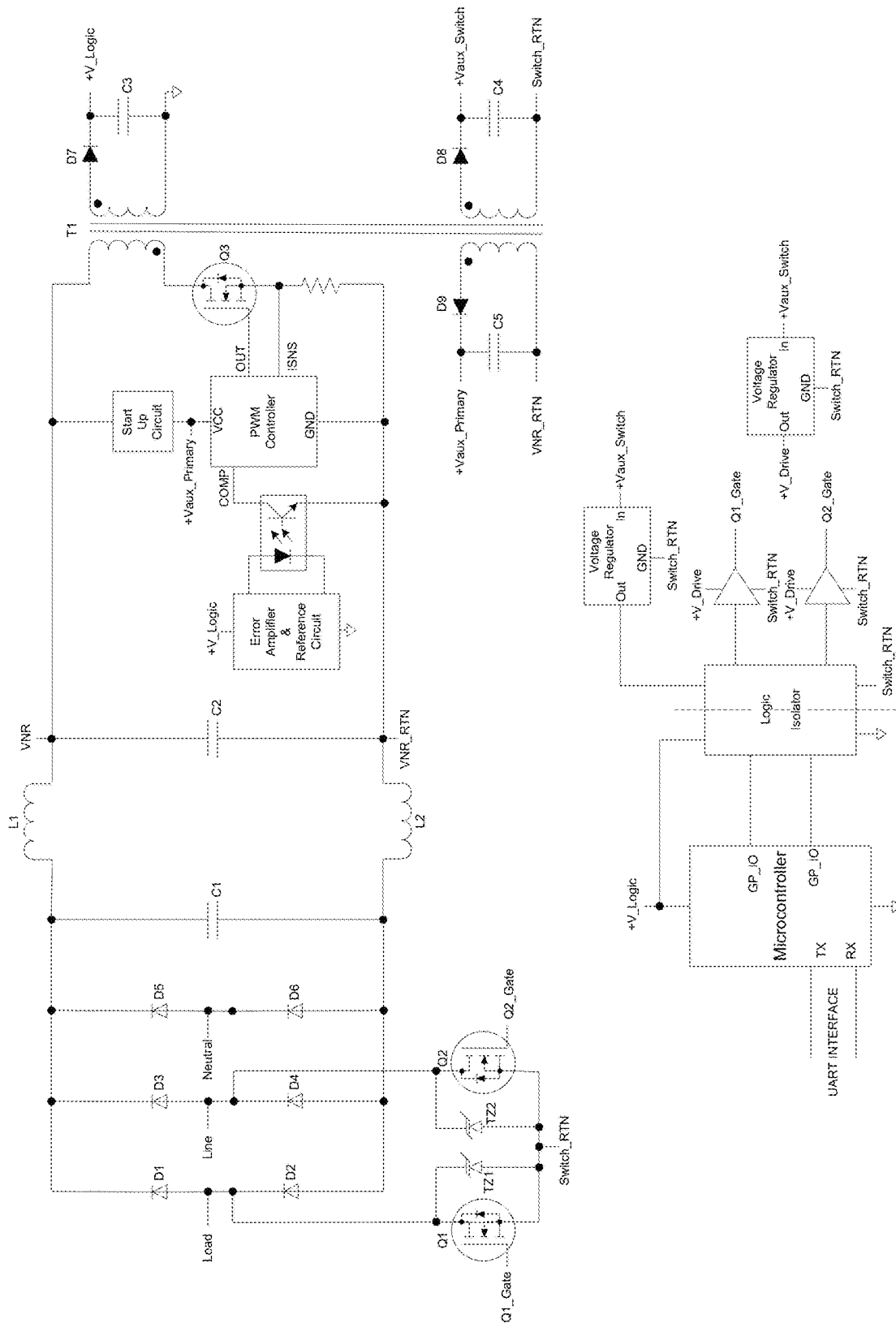
FIGS. 16-17 are schematic diagrams of power converters.

FIG. 16 shows a configuration that provides complete isolation of the logic voltage from the line voltages which may be needed in order to meet safety requirements depending on the mechanical design of the air gap switch. In this case the transformer needs two windings in addition to the primary and secondary in order to generate two isolated auxiliary voltages. One of these voltages is used to power the PWM controller. The other voltage is used to power the drivers to the switch devices, Q1 and Q2. If the switch devices shared the same common as the PWM IC one leg of the bridge rectifier would be shorted when Q1 and Q2 are on creating a short during one of the half cycles of the AC line relative to the neutral. The configuration in FIG. 16a prevents this condition by providing the additional isolation elements as well as this additional isolated bias voltage.

Figure 17:
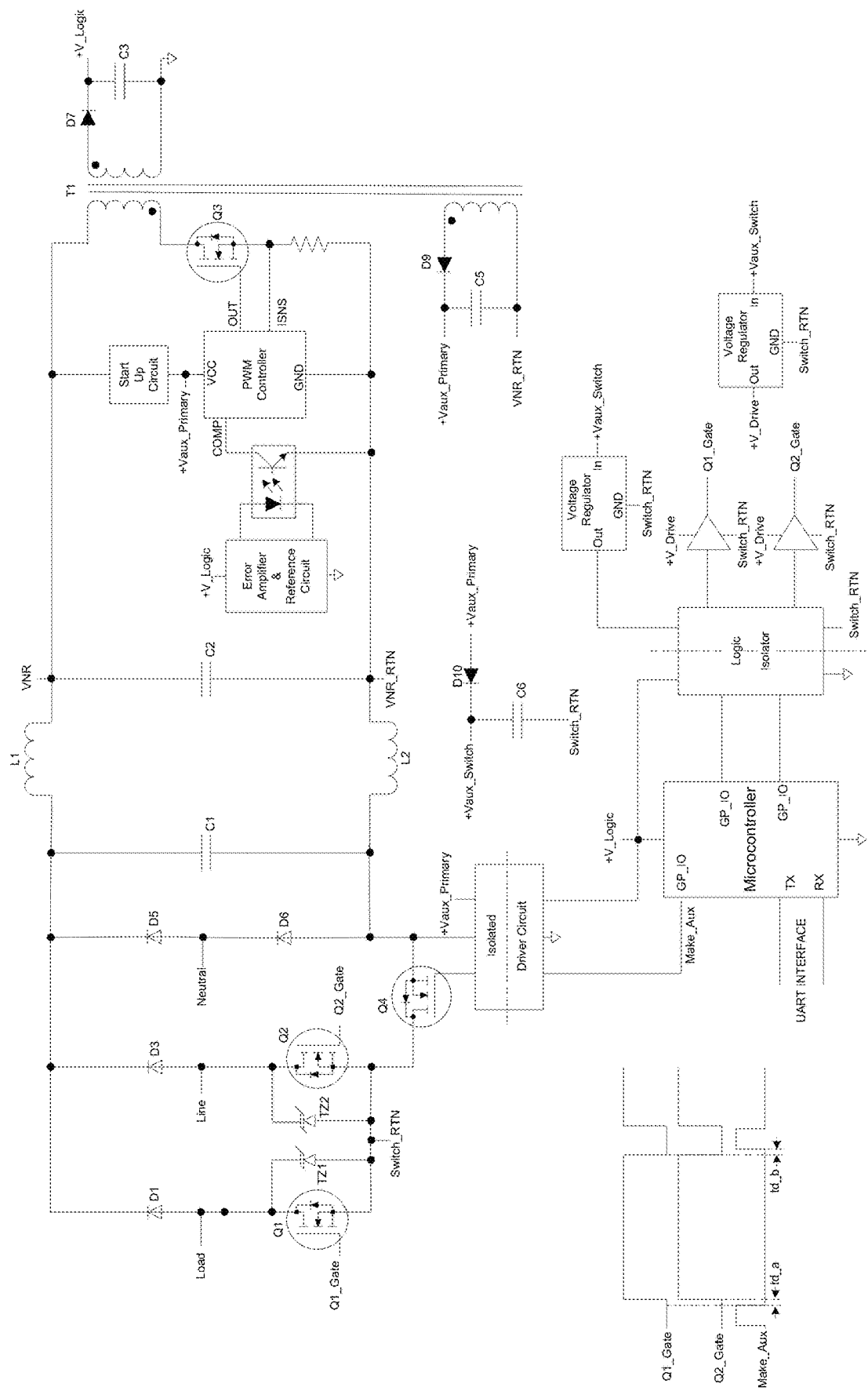

FIG. 17 shows an alternate configuration for sharing the rectifier for the power supply circuit with the switching device used to control the switched load. This configuration trades off complexity of the bias power supply transformer, T1, for an additional circuit element Q4. In this case the auxiliary power supply's transformer has one less winding which would simplify construction relative to safety requirements. In this configuration Q1 and Q2 make up the switch that controls the attached load and they are simultaneously turned on to energize said load. However, if neutral was connected without the addition of Q4, Q2 would short one of the legs of the bridge rectifier when on. Q4 is added to break the path of the short by timing when it is on relative to Q1 and Q2. Essentially Q4 becomes a controlled rectifier to keep the integrity of the bridge rectifier operation in place. The signal shown as Make_Aux in the timing diagram accomplishes this control function.

Figure 18:
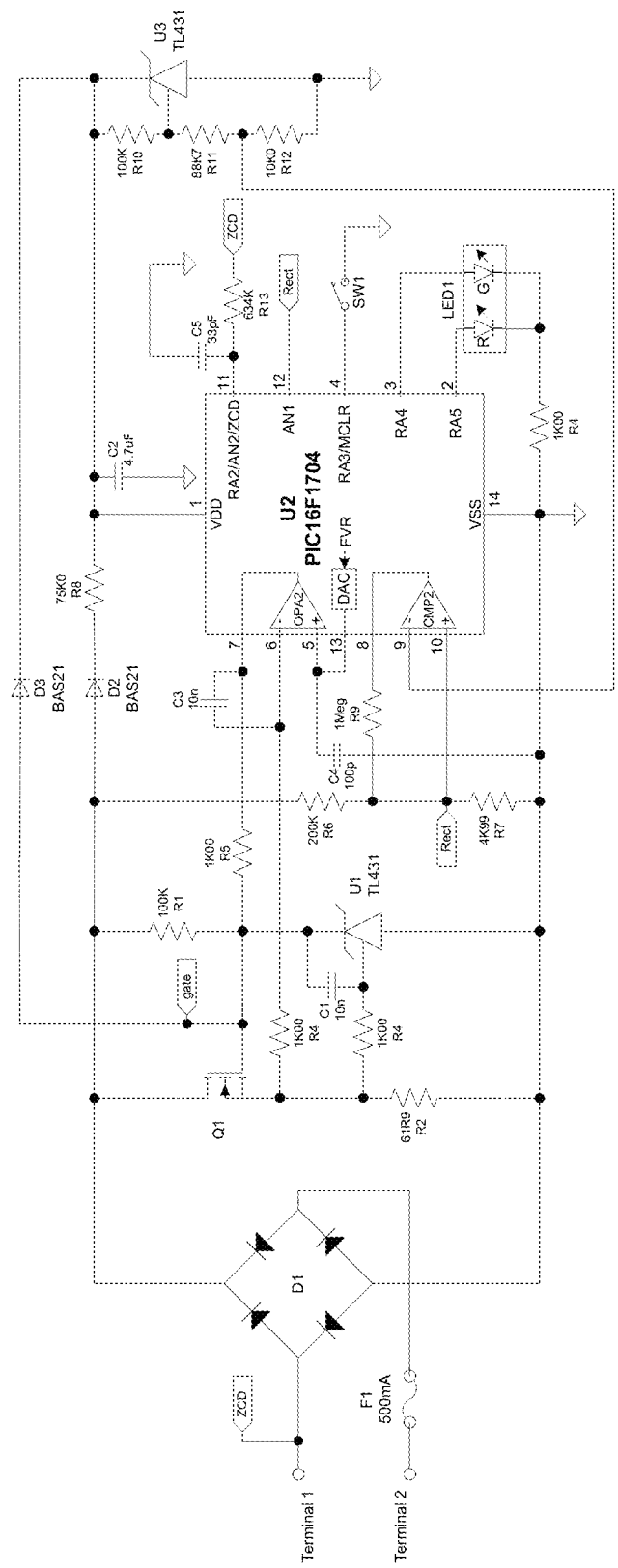
FIG. 18 is a schematic diagram of a current bleeding circuit.

FIG. 18 is a practical implementation of a controlled current source used as an accessory device to shunt current around an attached load in order to provide a means to harvest energy in certain applications. Incandescent and magnetic low voltage loads provide a means to harvest energy which are generally well behaved. However, many LED light bulbs have internal circuitry that either does not allow sufficient current to be passed though the bulb or that will turn on the LED during small portions of the line cycle if used as a means to harvest energy. This controlled energy source is intended to shunt current around the bulb in a controlled manner.

The microcontroller U2 runs software that determines the phase of the AC line and the condition of the voltage applied across terminals 1 & 2 and enables the current source formed by Q1 and R2 to shunt current around the bulb in a controlled fashion. If the bulb is intended to be on, the current source is disabled or set to a very low value. The rectifier D1 allows bi-directional operation of this current source. U1 is used to control the current though Q1 to a maximum value in the situation that U2 is not powered. When U2 is powered the internal operational amplifier can take control of this current source pulling it to a lower value by using firmware to adjust the DAC used as the current source reference. This DAC is internal to U2 in this implementation as shown. The comparator in U2 is used to detect the phase of the voltage applied and this can also be detected by the zero cross circuit internal to this microcontroller as an alternative approach. R8, C2 and U3 make up a simple shut regulator to power U2. An option to set different modes of operation is provided by SW1 and LED1 is used to indicate modes of operation. SW1 and LED1 are optional features. Some microcontrollers also contain temperature sensing elements that are internal and in the mechanical implementation U2 can be placed so that it has reasonable thermal coupling to Q1. In this case the firmware can be designed to enable the temperature sensing and adjust the current source vale to prevent excessive power dissipation in Q1 as a protection feature.

While various embodiments of the invention have been particularly shown and described, it will be understood by those skilled in the art that various changes in form and details may be made therein without departing from the spirit and scope of the invention as defined by the appended claims.

What is claimed is:

1. A power switch, comprising:
a line connection to a line side of an AC supply;
a load connection to a load, the load having a return connection to a return side of the AC supply;
a bridge-connected switching circuit including (1) a pair of MOSFETs connected back-to-back in series between the line connection and the load connection, an interconnection point of the MOSFETs being a first common connection, and (2) a pair of diodes connected back-to-back between the line connection and the load connection, an interconnection point of the diodes being a second common connection, each MOSFET having an ON state in which the MOSFET provides bidirectional channel conduction and an OFF state in which the MOSFET provides unidirectional body diode conduction; and
a line/load controller having a pair of supply inputs connected respectively to the first and second common connections for receiving operating power, the line/load controller being arranged and operative to (1) place both MOSFETs in the ON state to deliver normal operating current to the load when the load is to be powered for normal operation, and (2) place both MOSFETs in the OFF state to deliver a substantially reduced leakage current to the load when the load is not to be powered for normal operation, the leakage current providing the operating power delivered to the line/load controller via its supply inputs.

2. The power switch of claim 1, wherein the line/load controller is further arranged and operative, when the load is to be powered for normal operation, to (1) place both MOSFETS in the ON state during a major portion of each AC cycle when an AC line voltage has a magnitude greater than a predetermined threshold, and (2) place both MOSFETS in the OFF state during a minor portion of each AC cycle when the AC line voltage has a magnitude no greater than the predetermined threshold.

3. A power switch, comprising:
   a line connection to a line side of an AC supply;
   a load connection to a load, the load having a return connection to a return side of the AC supply;
   a switch connected between the line connection and load connection, the switch being configured and operative to selectively provide load current to the load from the AC supply;
   an energy harvesting capacitor configured and operative to store energy diverted from the load and provide the stored energy to local operating circuitry of the power switch;
   a wave shaping inductor in series between the switch and the load; and
   a diode circuit connecting the wave shaping inductor to the energy harvesting capacitor,
   wherein the inductor and the diode circuit are configured and operative to respond to the turning off of the switch to (1) increase a voltage of the inductor until it reaches substantially a voltage of the energy harvesting capacitor, and (2) thereupon, divert residual output current to the energy harvesting capacitor to add to its store of energy.

* * * * *